Oct. 21, 1958   J. KAMENETZKY   2,856,959
CONNECTING DEVICE FOR FLUIDS
Filed Jan. 14, 1954   4 Sheets-Sheet 1
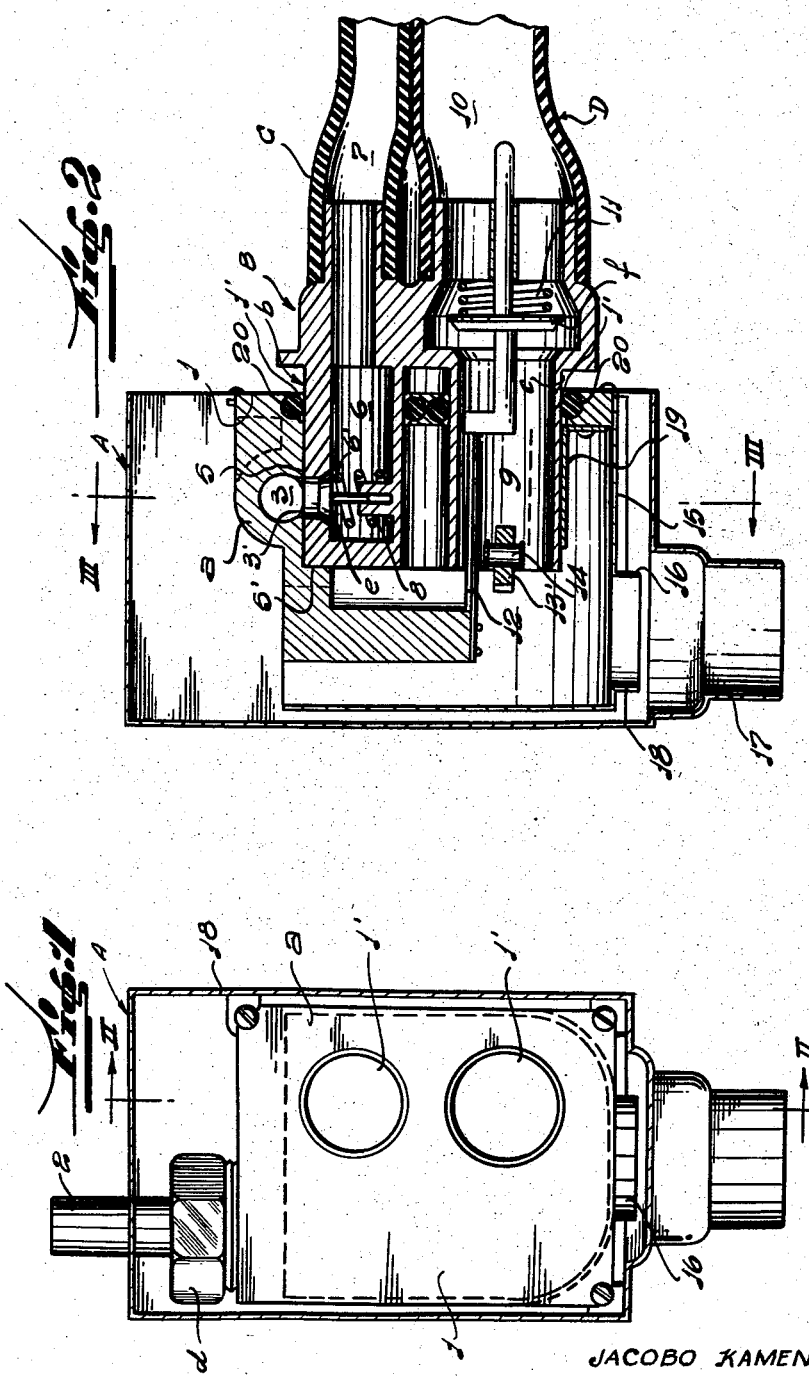
INVENTOR,
JACOBO KAMENETZKY
BY
Attorney

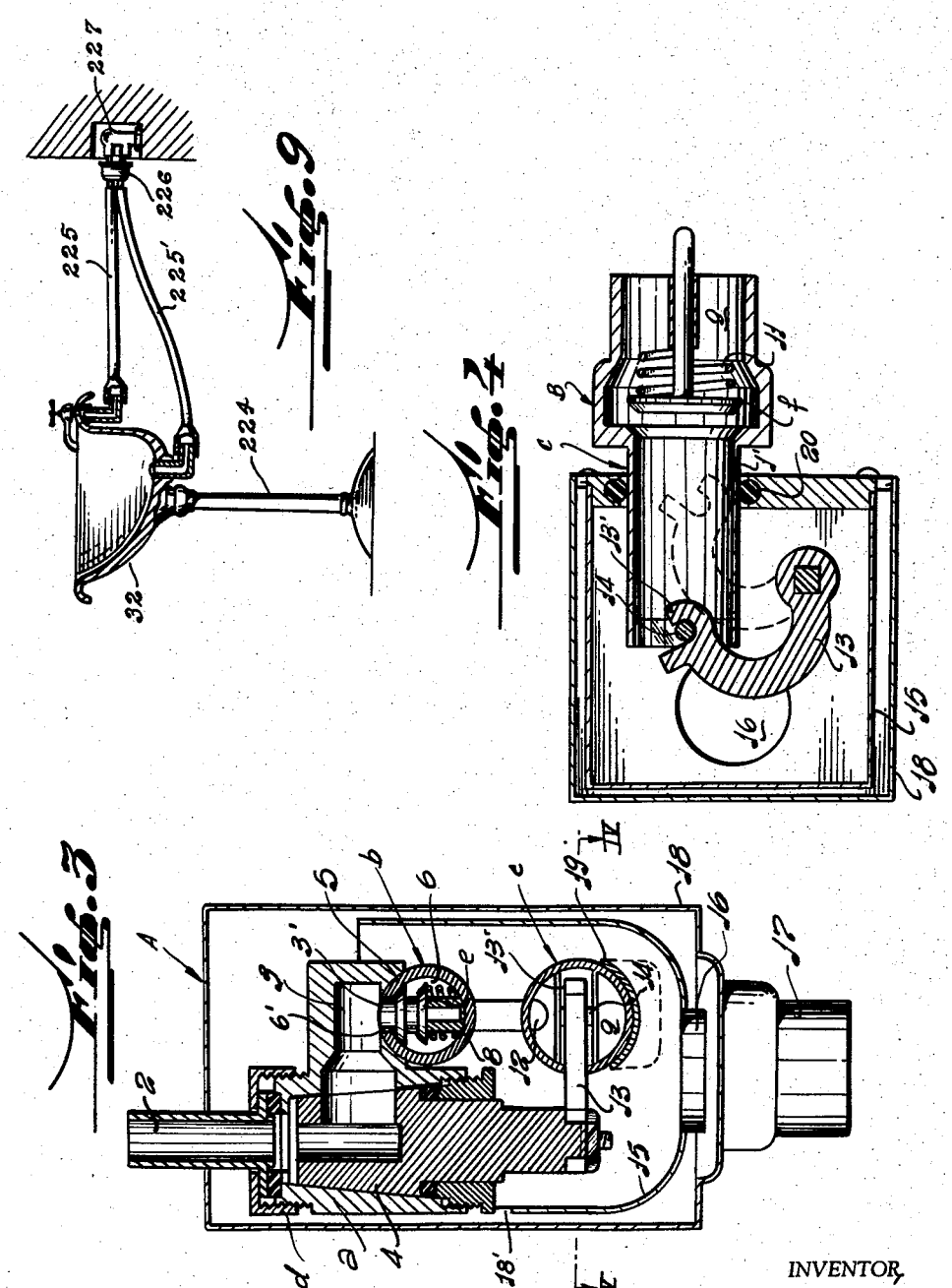

Oct. 21, 1958 J. KAMENETZKY 2,856,959
CONNECTING DEVICE FOR FLUIDS
Filed Jan. 14, 1954 4 Sheets-Sheet 3
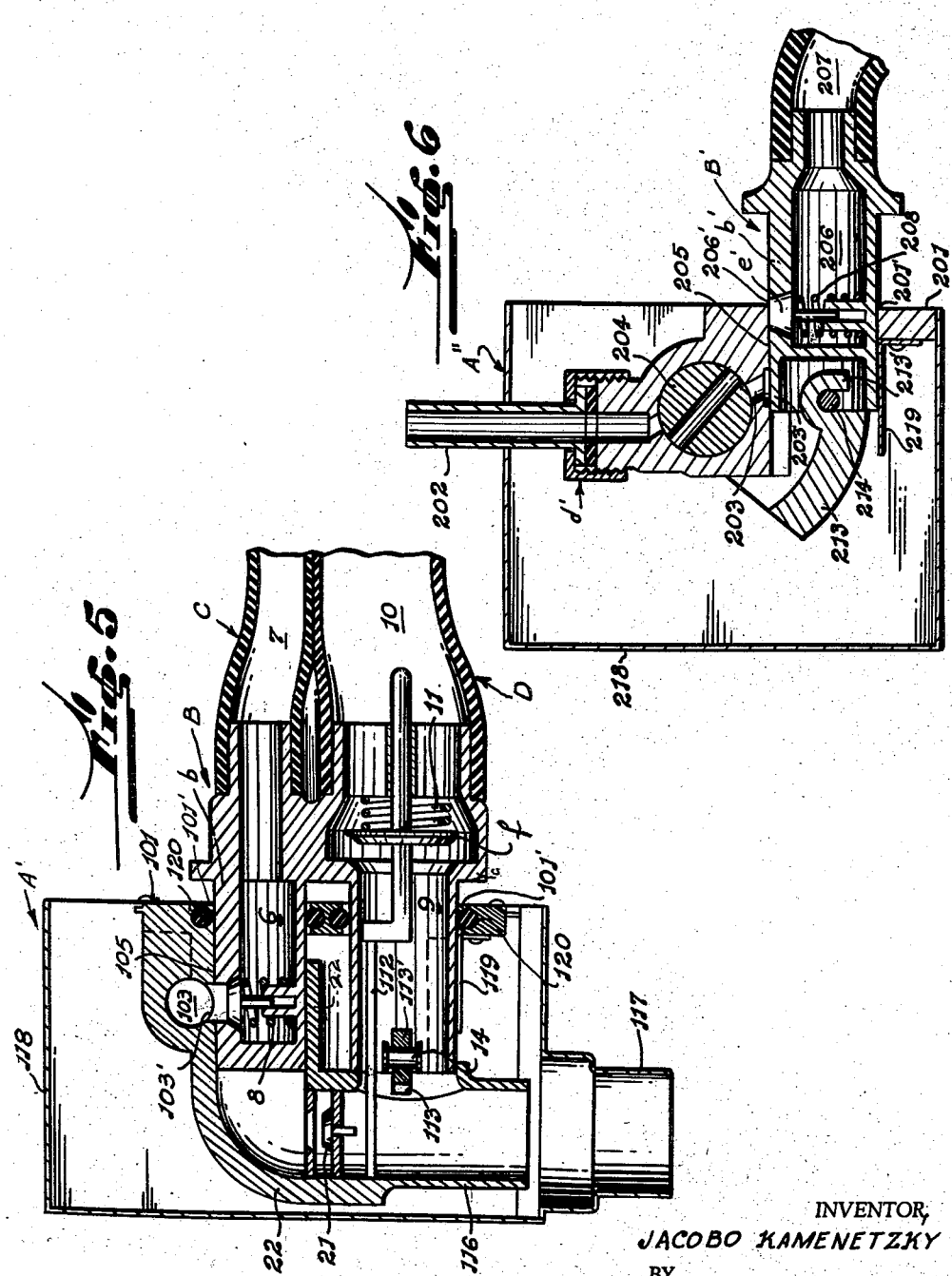
INVENTOR,
JACOBO KAMENETZKY
BY

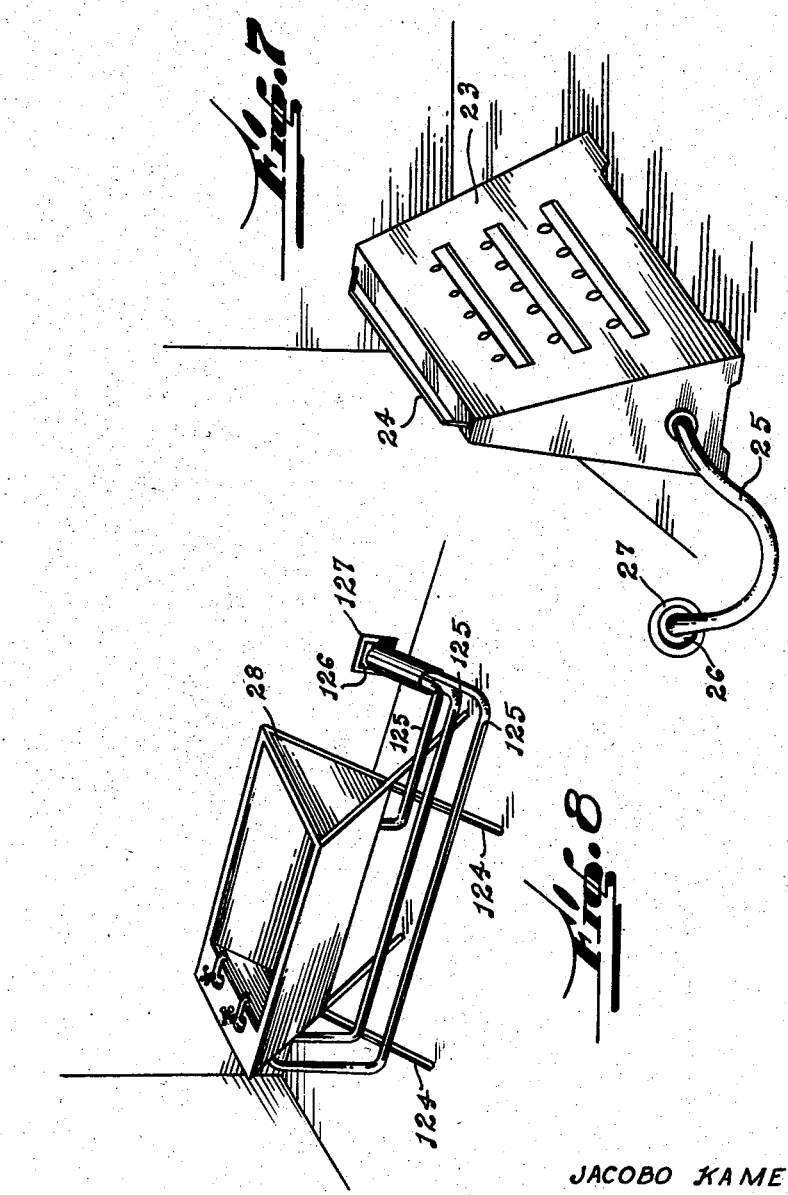

United States Patent Office 2,856,959
Patented Oct. 21, 1958

2,856,959

CONNECTING DEVICE FOR FLUIDS

Jacobo Kamenetzky, Buenos Aires, Argentina

Application January 14, 1954, Serial No. 404,099

9 Claims. (Cl. 137—599.1)

The present application is a continuation-in-part of my copending application Ser. No. 150,583, filed March 20, 1950, now abandoned.

The present invention is directed to a connecting device for use with fluids and more particularly to a connecting device having a socket portion and a plug portion, the socket portion being adapted to be secured to a part of a building or other structure having a circulating fluid system, the plug portion being adapted to be connected to an appliance or other device for utilizing the circulating fluid.

In accordance with the present invention the plug portion is connectable to the socket portion solely by relative rectilinear sliding movement between said plug portion and said socket portion.

In the preferred construction, the socket portion includes conduit means for providing communication between a fluid supply source and said plug, said conduit means including a closure member which is actuated solely by said rectilinear movement, said closure member permitting fluid to flow through said conduit means only when said plug portion is in said socket portion. The plug portion includes conduit means terminating in an opening for communicating with said conduit means in said socket portion, the axis of said opening being at an angle, and preferably perpendicular, to the direction of said rectilinear sliding movement to prevent fluid pressure in the conduit means in said socket portion from ejecting said plug portion. The connecting device also includes means to automatically open said closure member when said plug portion is inserted into said socket portion and to automatically close said closure member when said plug portion is withdrawn from said socket portion.

The means to automatically open and close said closure member preferably comprises a bilateral mechanical link and an actuating means which automatically operatively engages said link to open said closure member when the opening in said plug portion communicates with the conduit means in the socket and to close the closure member when the plug portion is withdrawn from the socket portion. In the preferred construction, the bilateral mechanical link is secured to the closure member and the actuating means is secured to the plug portion.

The plug portion may also include return conduit means for returning fluid from the appliance to the socket portion, the return conduit means communicating with fluid collecting means in the socket portion. There is also provided therein conduit means in the socket portion communicating with the collecting means. There may be provided in all conduit means in the plug portion valve means to maintain these conduits normally closed.

One of the objects of the present invention is to provide a connecting device for fluids having a socket portion and a plug portion wherein the plug portion may be connected to the socket portion solely by relative rectilinear sliding movement between said plug portion and said socket portion.

It is a further object of the present invention to provide means for preventing the fluid pressure in the conduit means in the socket portion from ejecting the plug portion.

It is a further object of the present invention to provide a connecting device having a plug portion and a socket portion being so constructed that when the plug portion is connected to the socket portion, there will be no fluid leakage during the insertion or removal of the plug portion from the socket portion.

It is a further object of the present invention to provide a connecting device having a socket portion and a plug portion wherein the plug can be inserted into the socket portion with one hand.

Further objects will become apparent from the following detailed description of some preferred embodiments of the present invention the principal features of which have been illustrated by way of example in the annexed drawings wherein:

Figure 1 is a front view of the socket portion of the connecting device according to one embodiment of the invention;

Figure 2 is a cross section along line II—II of the socket portion of Figure 1 which is shown with a plug inserted therein;

Figure 3 is a vertical section along line III—III of the device shown in Figure 2;

Figure 4 is a horizontal section along line IV—IV of the device shown in Figure 3;

Figure 5 is a section similar to that of Figure 2 but shows an alternative detail of the draining or return circuit;

Figure 6 represents, in a section similar to that of Figure 2, another embodiment of the device according to the present invention which does not have a return conduit;

Figure 7 is a schematical representation of one embodiment of the entire system for fluids which need not be returned;

Figure 8 is a similar representation of a system comprising a return line; and

Figure 9 is a representation similar to Figure 8 showing a further application of the system of the present invention.

Throughout the several figures, the same reference numerals have been used in order to designate equal or corresponding parts.

Referring to Figures 1 to 4, it will be seen that according to the embodiment shown therein the connecting device consists of a socket portion A having a valve casing $a$ provided in its front face 1 with openings 1' wherein the pins $b$ and $c$ of the plug B may be removably inserted in order to connect the plug B to the socket A. The plug B is adapted to be connected through flexible pipes C and D to an appliance (not shown) attachable to the fluid system and provided with means for rendering the appliance movable.

The socket A is provided with a nozzle 2 adapted to be connected to the fluid supply line of the system with the aid of a nut $d$. The nozzle 2 communicates with a conduit 3 which extends through the valve casing $a$ wherein the closure member 4, shown in open position in Figure 3, is housed. Said conduit 3 terminates in an opening 3' of the passage 5. The pin $b$ comprises a conduit 6 terminating in an opening 6' which, when the plug is disconnected, is closed by a valve $e$ comprising a spring 8. At the opposite end, the conduit 6 communicates with bore 7 of the tube C.

Inside the pin $c$ a conduit 9 is arranged which at one end communicates with the bore 10 of tube D, which conduit contains the valve $f$ urged by spring 11 towards its closed position while the pushing rod 12 opens said valve when the plug is inserted in the socket.

The closure member 4 is provided with an integral arm 13 having a hook 13' adapted to be linked to a bolt 14 of the pin $c$ which also serves as a guide therefor.

The socket A includes a collecting container 15, the bottom of which is provided with an outlet extension 16 registering with a nib 17 of the casing 18 which houses all the parts of the socket, the nib 17 being adapted to be connected to the fluid return line of the system. Secured to the socket is a resilient tongue 19 urging the pin $c$ and consequently also pin $b$ against the passage 5 when said pins are inserted. The resilient ring members 20 anchored to the openings 1' prevent losses of fluid not avoided by the tongue 19 and similar leakages.

The device so far described operates as follows:

When the plug B is to be coupled, the operator introduces the pins $b$ and $c$ into the openings 1' against the action of the tongue 19 until they engage the stop 5' of the passage 5. At this moment, the openings 3' and 6' are interconnected and valve $e$ is opened by the pressure of the fluid, because the closure member 4 was opened when the plug was inserted into the socket. Closure member 4 was opened because bolt 14 on pin $c$ pushed the arm 13 to cause rotation and opening of the closure member 4. Meanwhile, any fluid contained in the appliance flows through valve $f$, which is open under the action of arm 12, and drops into container 15 from which it flows back through outlets 16 and 17 to the return line of the system.

Similarly, when the plug is withdrawn from the socket, bolt 14 rotates the arm 13 of the closure member 4 to close the closure member, the bolt 14 disengaging itself from hook 13' as the plug is withdrawn. A short time before the plug has been completely removed from the socket, the valves $e$ and $f$ close since the pressure of the fluid on the valve $e$ and the pressure of rod 12 on valve $f$ have ceased. The fluid still in the connecting parts of the device (such as the pins $b$ and $c$, and of the passage 3, etc.) will drain into the outlets 16 and 17 which constitute an inside draining circuit to the socket.

It will be evident that in the structure described and shown the arrangement of the valve $e$ at the outer end of the pin $b$ prevents the same from retaining fluid when withdrawn, but in connection with other embodiments the draining circuit described may be necessary. Any fluid remaining in the plug or the flexible pipes C and D will not leave because the valves $e$ and $f$ close upon removal of the plug from the socket.

The arm 13 integral with the closure member 4 constitutes together with hook 13' and bolt 14 a bilateral link for transmitting the relative movement between the plug and the closure member 4, and, therefore, the latter, in order to return to its initial position, does not require a spring to urge it towards its closed position.

It will be seen that the communication existing during the interconnection of the connecting members, as provided for by the interconnected openings 3' and 6', and the collecting container 15, constitute a draining circuit incorporating a means effective to prevent the fluid from flowing back to the connecting members.

Another solution for this problem would consist in inserting a check valve 21 as shown in Figure 5 which allows the fluid to flow in one single direction only within the collecting pipe 22 used to replace the collecting container 15, already mentioned. Collecting pipe 22 communicates with outlet extension 116, the latter registering with nib 117. Otherwise, the structure of Fig. 5 is the same as that of Fig. 2, the reference characters A', 101, 101', 103, 103', 105, 112, 113, 113', 118, 119 and 120 corresponding respectively to A, 1, 1', 3, 3', 5, 12, 13, 13', 18, 19 and 20 of the structure set forth in Figs. 1 through 4. The plug portion is identical with that of Fig. 2.

The resilient tongue has for its purpose the transformation of the operator's force acting in the direction corresponding to the axis of the pin $c$ into a force perpendicular to such direction to obtain hermetical juxtaposition of the orifices 3' and 6'. At the same time the slope angle that said tongue forms in relation with the axis of the interconnected orifices, which angle exceeds 45°, produces a multiplication of the operator's force, which is thus translated into an increase of said perpendicular force. The resilient property of the tongue provides for a fluid-tight connection between the passage 5 and pin $b$ even before the orifices 3' and 6' are superposed.

The manner in which orifice 6' of the passage 6 and the lateral surface of pin $b$ are interconnected produces a resultant force of the fluid pressure in a direction transverse to the coupling direction of the plug. Thus, the fluid pressure on the plug, particularly when the liquid supplying accessories of the appliance are closed, will be in a direction perpendicular to the direction in which the plug must be moved to be uncoupled. In the preferred construction where the orifice 6' is perpendicular to the lateral surface of the pin $b$, any pressure of the fluid which tends to remove the plug will be counteracted by an equal pressure in an opposite direction since the front of the pin $b$ is closed.

The two arms forming hook 13', in their common length, constitute the bilateral link portion, while in their remaining length, not common, they represent a link cooperating with said bilateral link.

An aim of the collecting device is to control the drainage conduit of the socket, in order to avoid contamination due to sewage flow-back when the socket and plug are used to provide drinkable water or liquids in good condition of purity to the appliance. To such an effect the connecting device is provided with a flange 18' which is at a level lower than the level of the accessories and through which, in extreme instances, water would overflow without touching the plug and socket portions, thus preventing the sewage from reaching the portion of the appliance which may be affected by contamination.

Figure 6 represents a similar device for use in connection with a fluid which is not desired to return. The structure and operation thereof needs no further description since both are similar to those of the device illustrated in Figures 1 and 4, with the only difference that the pin $c$ has been omitted. Furthermore, the bolt 214 in this case extends vertically and not horizontally as in the former embodiment, and also such bolt is integral with pin $b'$ instead of pin $c$ as before described. Finally, the axis of rotation of the closure member 204 and consequently that of its integral arm 213 extend vertically and not horizontally. In Fig. 6 the reference characters A", B', $d'$, $e'$ correspond respectively to A, B, $d$ and $e$ of the modification in Figs. 1–4. Numerals 201, 201', 202, 203, 203', 205, 206, 206', 207, 208, 213', 218 and 219 correspond respectively to parts 1, 1', 2, 3, 3', 5, 6, 6', 7, 8, 13', 18 and 19 of the modifications of Figs. 1–4.

Figure 7 shows a system complementary to an installation for supplying to a building a fluid which is not desired to be returned such as for instance a combustible gas. The gas stove 23 is provided with means 24 for rendering the same movable and is connected through a flexible pipe 25 to one 26 of two parts 26, 27 which may be coupled one to another, of a device of the type comprising two parts able to be coupled together and to open at least one valve contained in at least one of them automatically upon insertion of one part such as plug 26 and to close said valve automatically upon removal of said parts. The other part 27 forms part of the permanent system. The connecting device may be the device herein described or may be of any other suitable construction. The appliance shown as gas stove 23 may be any other appliance or device such as for instance a gas-actuated iron destined to be employed instead of the conventional electric irons.

Figure 8 shows a system similar to that illustrated in

Figure 7 but provision has been made for recycling the fluid supplied or another fluid, for instance clean water and used water, or steam and condensed steam, etc.

The appliance, which in this case is a bath-tub 28, having means such as 124 for rendering the same movable and for rendering the same foldable, is provided with flexible hoses 125 which comprise three ducts, namely: one each for supplying cold and hot water and for withdrawing used water, respectively, to a cold water tap and a hot water tap and from a check valve. These hoses 125 are connected to plug 126 which may be plugged into socket 127. In cases such as that of Figure 8, where there are several supply lines, there must be a corresponding number of closure members 4, or alternatively, if one single closure member is used, this must be provided with the corresponding number of conduits 3.

Figure 9 shows a simplified arrangement for a lavatory 32 provided with the means 224 for rendering the same movable. Said arrangement comprises one duct 225 for supplying a liquid to a tap and a separate duct 225′ connected to the check-valve of the lavatory. Ducts 225 and 225′ are connected to plug 226 which is inserted into socket 227.

What I claim is:

1. In a connecting device, a socket portion and a plug portion, said plug portion being connectable to said socket portion solely by relative rectilinear sliding movement between said plug portion and said socket portion, said socket portion including conduit means for providing communication between a fluid supply source and said plug, a closure member in said conduit means, said closure member being actuated solely by said rectilinear movement, said closure member permitting fluid to flow through said conduit means only when said plug portion is in said socket portion, conduit means in said plug portion terminating in an opening for communicating with said conduit means in said socket portion, the axis of said opening being at an angle to the direction of said rectilinear sliding movement to prevent the fluid pressure in the conduit means in said socket portion from ejecting said plug portion, and means to automatically open said closure member when said plug portion is inserted into said socket portion and to automatically close said closure member when said plug portion is withdrawn from said socket portion.

2. A connecting device as recited in claim 1 wherein said means to automatically open and close said closure member comprises a bilateral mechanical link and an actuating means which automatically operatively engages said bilateral mechanical link to open said closure member when said opening in said plug communicates with said conduit means in said socket and to close said closure member when said plug portion is withdrawn from said socket portion.

3. A connecting device as recited in claim 2 wherein said bilateral mechanical link is secured to said closure member and said actuating means is secured to said plug portion.

4. A connecting device as recited in claim 1 wherein the axis of said opening is perpendicular to the direction of said rectilinear sliding movement.

5. A connecting device as recited in claim 1 wherein the conduit means in said plug portion includes a valve means which normally closes said conduit means.

6. A connecting device as recited in claim 1 wherein said socket portion includes means acting at an angle to said direction of rectilinear movement to maintain said opening in close communication with the conduit means in the socket portion.

7. A connecting device as recited in claim 1 wherein said plug portion includes return conduit means which communicates with fluid collecting means in said socket portion when said plug portion is in operative engagement with said socket portion and drain conduit means in said socket portion in communication with said collecting means.

8. A connecting device as recited in claim 7 wherein said return conduit means in said plug portion includes valve means to maintain said conduit means normally closed.

9. In a connecting device, a socket portion and a plug portion, said plug portion being connectable to said socket portion solely by relative rectinear sliding movement between said plug portion and said socket portion, said socket portion including inlet conduit means for providing communication between a fluid supply source and said plug, a closure member in said inlet conduit means, said closure member being actuated solely by said rectilinear movement, said closure member permitting fluid to flow through said inlet conduit means only when said plug portion is in said socket portion, said socket portion also including fluid collecting means, drain conduit means in said socket portion communicating with said fluid collecting means, inlet conduit means in said plug portion terminating in an opening for communicating with said inlet conduit means in said socket portion, the axis of said opening being at an angle to the direction of said rectilinear sliding movement to prevent the fluid pressure in the inlet conduit means in said socket portion from ejecting said plug portion, said plug portion also including return conduit means which communicates with the fluid collecting means in said socket portion when said plug is in operative engagement with said socket portion, a bilateral mechanical link secured to said closure member and an actuating means secured to said plug portion, said actuating means automatically operatively engaging said bilateral mechanical link to open said closure member when said opening communicates with said inlet conduit means in said socket portion and to close said closure member when said plug portion is withdrawn from said socket portion.

References Cited in the file of this patent

UNITED STATES PATENTS

| | | |
|---|---|---|
| 1,927,448 | Terry | Sept. 19, 1933 |
| 2,135,889 | Flader | Nov. 8, 1938 |
| 2,188,308 | Pearson | Jan. 30, 1940 |
| 2,222,746 | Kamenarovic | Nov. 26, 1940 |
| 2,439,275 | Spotz | Apr. 6, 1948 |
| 2,625,168 | Charlson | Jan. 13, 1953 |
| 2,742,052 | McKee | Apr. 17, 1956 |

FOREIGN PATENTS

| | | |
|---|---|---|
| 441,337 | Great Britain | Jan. 13, 1936 |
| 699,918 | Germany | Dec. 9, 1940 |